(12) United States Patent
Oh et al.

(10) Patent No.: US 8,150,164 B2
(45) Date of Patent: Apr. 3, 2012

(54) SYSTEM AND METHOD FOR IDENTIFYING IMAGE BASED ON SINGULAR VALUE DECOMPOSITION AND FEATURE POINT

(75) Inventors: Weon Geun Oh, Daejeon (KR); Hyeong Yong Jeon, Daejeon (KR); Chi Jung Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1189 days.

(21) Appl. No.: 11/832,090

(22) Filed: Aug. 1, 2007

(65) Prior Publication Data
US 2008/0240574 A1    Oct. 2, 2008

(30) Foreign Application Priority Data
Mar. 30, 2007  (KR) .................. 10-2007-0031495

(51) Int. Cl.
 G06K 9/46  (2006.01)
 G06K 9/40  (2006.01)
(52) U.S. Cl. .................... 382/190; 382/201; 382/254
(58) Field of Classification Search .................. 382/190, 382/173, 181, 201, 224, 232, 254–266, 276, 382/274, 275, 305; 503/227; 358/471, 518, 358/403, 527, 448; 399/166, 314; 430/204, 430/487, 218, 494, 244; 428/914, 913; 156/235; 348/761; 349/25, 2
See application file for complete search history.

(56) References Cited

U.S. PATENT DOCUMENTS
7,747,106 B2 * 6/2010 Spence et al. ................. 382/296
2009/0028403 A1 * 1/2009 Bar-Aviv et al. ............. 382/128

OTHER PUBLICATIONS
Seo, J.S., et al. "A Robust Image Fingerprinting System Using the Radon Transform", Image Communication, 19(2004):325-339.
Lowe, D.G., "Distinct Image Features from Scale-Invariant Keypoints", International Journal of Computer Vision, 1-28(Jan. 5, 2004).

* cited by examiner

Primary Examiner — Sheela C Chawan

(57) ABSTRACT

A system and method for identifying an image based on singular value decomposition is provided. The system includes: a feature point extracting module for extracting at least one of feature points from an input image using strength of a Gaussian curvature of each pixel from the input image; an identifier detecting module for detecting a local identifier based on SVD (singular value decomposition) for blocks adjacent to the extracted feature points; and a matching module for determining whether an image is duplicated or not by comparing the detected local identifier from the identifier detecting module with an image database storing at least one of images.

22 Claims, 3 Drawing Sheets

SYSTEM AND METHOD FOR IDENTIFYING IMAGE BASED ON SINGULAR VALUE DECOMPOSITION AND FEATURE POINT

BACKGROUND OF THE INVENTION

1. Field of the Invention

The present invention relates to a system and method for identifying an image, and more particularly, to a system and method for identifying an image based on singular value decomposition (SVD) in order to identify images transformed by duplication and malicious attack, or according to a type of Internet and a reproducing device.

2. Description of the Related Art

As the demand of digital contents increases, an enormous amount of multimedia contents including video, audio, and image have been produced, distributed and serviced constantly. Among the multimedia contents, numerous digital still images (hereinafter images) have been explosively produced and distributed due to the popularization of high-performance portable digital cameras and the price drop of large capacity storage devices or portable storage mediums. There were many researches in progress to develop a technology for effectively searching a target image from numerous images or accurately identifying the target image from others. Such a technology refers to an image searching technology.

Conventionally, many image searching methods using meta data (key word) or contents of an image have been introduced. Since such conventional image searching methods use previously inputted information or original information included in an image, for example, color and texture, the conventional image searching methods were only useful to search an original image which is not transformed or modified.

The conventional image searching methods, however, cannot be used if the image is unlawfully modified through duplication or malicious attack, or if the original characteristics of the image, for example, the size, the format, and the quality, change according to a type of Internet or a reproducing device. In order to search such modified image, a technology for identifying a modified image is needed. Such a technology refers an image identifying technology.

Various technologies for identifying a modified image have been introduced. The image identifying technology has been classified into a feature point based image identifying technology and a non-feature point based image identifying technology.

Jin. S introduced one of representative non-feature point based image identifying methods, which uses a random transform scheme. After modifying or compressing images using an affine transform scheme, a Gaussian filter, a median filter, a cropping scheme, and a JPEG scheme, a simulation of identifying the modified images using the Jin's method is performed.

In the Jin's method, original characteristics of an image are defined as a finger print, and the finger print is formed of 400-bit data per one image. The overall performance of Jin's method is good. However, the Jin's method is too weak to identify an image modified by the cropping scheme or to identify a geometrically modified image.

Lowe introduced scale invariant feature transform (SIFT) as a feature point based image identifying method. In the SIFT, the identity of images is determined using a feature point and values adjacent to the feature point.

The SIFT is good to identify an image modified by cropping or a partially covered image. However, the SIFT is too weak to identify a geometrically modified image, for example, a tilted image, or a perspective-transformed image. Furthermore, the SIFT requires a complicated calculation process and a long time to determine the similarity of two feature points.

SUMMARY OF THE INVENTION

Accordingly, the present invention is directed to a system and method for identifying an image based on singular value decomposition (SVD), which substantially obviates one or more problems due to limitations and disadvantages of the related art.

It is an object of the present invention to provide a system and method for identifying an image based on singular value decomposition (SVD) in order to stably and quickly search and identify an image although the image is geometrically or non-geometrically transformed by duplication or malicious attack, or according to a type of Internet or reproducing device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for identifying an image based on SVD (singular value decomposition), including: a feature point extracting module for extracting at least one of feature points from an input image using strength of a Gaussian curvature of each pixel from the input image; an identifier detecting module for detecting a local identifier based on SVD (singular value decomposition) for blocks adjacent to the extracted feature points; and a matching module for determining whether an image is duplicated or not by comparing the detected local identifier from the identifier detecting module with an image database storing at least one of images.

The feature point extracting module may measure strength of a Gaussian curvature using eigen-value of a Hessian matrix to extract a feature point, and the eigen-value of the Hessian matrix may be calculated by a second order partial differential value for each pixel.

The feature point extracting module may extract a candidate feature point group by comparing strength of a Gaussian curvature for each pixel with a pre-set threshold value, and the feature point extracting module may sort the candidate feature point group in a descending order based on strength and extracts a feature pint except feature points overlapped on a distance from a candidate group.

The identifier detecting module may divide a local region adjacent to the extracted feature point to the same size of sub regions, and calculates a singular value by decomposing each of the sub regions into singular value decomposition (SVD) to detect an identifier based on the calculated singular value. The identifier detecting module may contract the singular values of the sub-regions to one value to detect the identifier.

In another aspect of the present invention, there is provided a method for identifying an image based on SVD (singular value decomposition), including the steps of: measuring strength of a Gaussian curvature of each pixel from an input image; extracting at least one of feature points by comparing the measured strength of the Gaussian curvature of each pixel with a pre-set threshold value; dividing a local region adjacent to the extracted feature pint into a same size of sub regions; detecting an identifier by decomposing each of the sub regions to SVD (singular value decomposition) and obtaining singular value based on the SVD; and determining similarity by comparing the detected identifier with an image database storing at least one of images.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Hereinafter, a system and method for identifying an image based on singular value decomposition (SVD) according to an embodiment of the present invention will be described with reference to the accompanying drawings.

Figure 1:
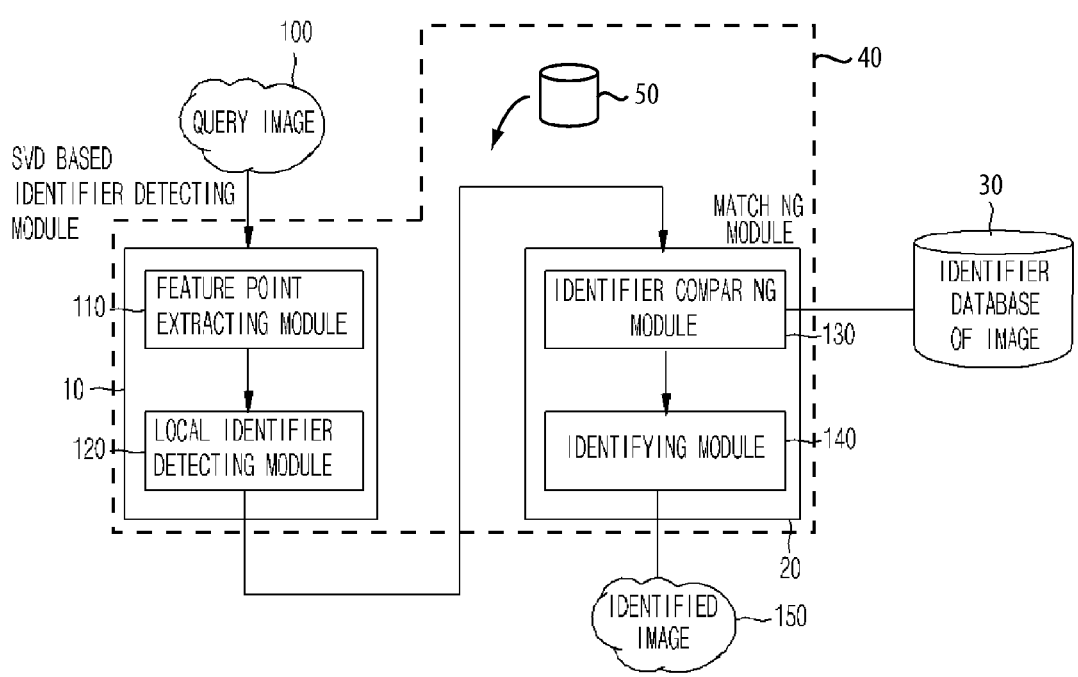
FIG. 1 is a diagram illustrating a system for identifying an image based on a singular value decomposition (SVD) according to an embodiment of the present invention.

FIG. 1 is a diagram illustrating a system for identifying an image based on singular value decomposition (SVD) according to an embodiment of the present invention.

The SVD based image identifying system according to the present embodiment includes a SVD based identifier detecting module 10 and a matching module 20. That is, the SVD based image identifying system according to the present embodiment searches and compares a SVD based identifier to find a query image from an original database.

The SVD based identifier detecting module 10 includes a feature point extracting module 110 and a local identifier detecting module 120.

The feature point extracting module 110 extracts a feature point from a query image 100 with strength of Gaussian curvature as a reference.

The local identifier detecting module 120 searches a local identifier using singular value decomposition (SVD) based on values adjacent to the extracted feature point from the feature point extracting module 110.

The matching module 20 determines similarity between the query image and an image stored in an identifier database 30 by comparing the query image with the stored image using the feature point extracted from the SVD based identifier detecting module 10 and the searched local identifier. In order to determine the similarity, the matching module 20 determines whether feature points in images are identical or not using the local identifier. FIG. 1 shows the identifier detecting module 10 and the matching module 20 as part of a host computer system 40. As is well known in the art, the host computer system 40 includes a computer-readable medium 50 having embodied thereon computer code configured to extract a feature point, search a local identifier, and compare and identify an image. As used herein, the term "computer-readable medium" broadly encompasses tangible structures such as memory devices based upon magnetic, optical, and/or semiconductor-based storage principles, but excludes intangible entities such as signals, carrier waves, or transmission media.

The matching module 20 includes an identifier comparing module 130 and an identifying module 140.

The identifier comparing module 130 determines the similarity between the query image and an image stored in a database based on a similarity distance measured between the identifiers of the query image and the stored image.

The identifying module 140 determines whether the query image is duplicated or not based on the similarity determined by the identifier comparing module 130.

Figure 2:
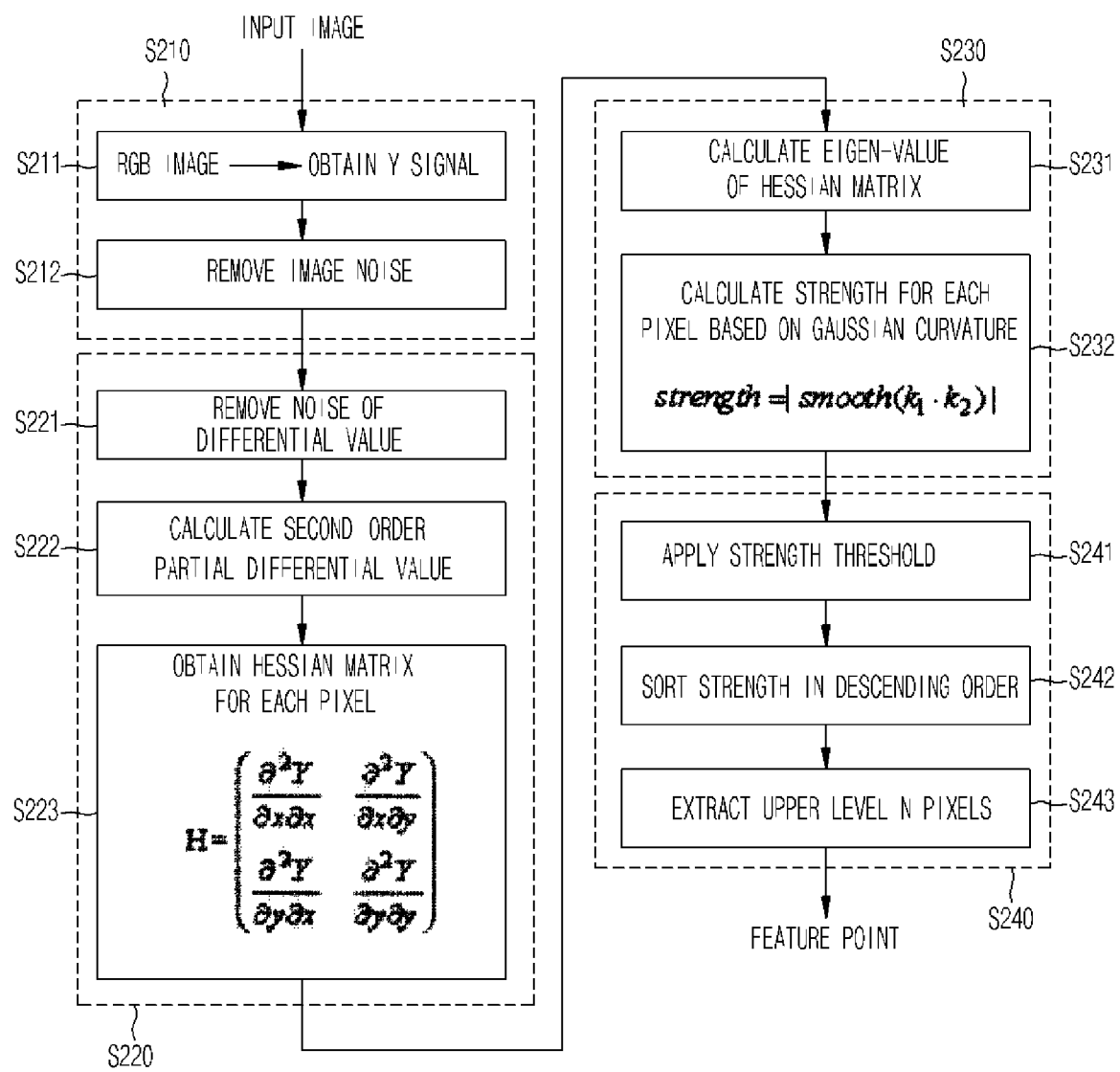
FIG. 2 is a diagram illustrating a process of extracting a feature point in a SVD based image identifying system according to an embodiment of the present invention.

FIG. 2 is a diagram illustrating a process of extracting a feature point in a SVD based image identifying system according to an embodiment of the present invention.

The process of extracting a feature point in the SVD based image identifying system according to the present embodiment includes four steps.

The first step is a preprocessing step S210. In the preprocessing step S210, a Y-signal component is extracted from an input image at step S211 if the input image is a color image, for example, a RGB image. The Y-signal component can be obtained by Eq. 1.

$$Y = 0.256788 \times R + 0.504129 \times G + 0.097906 \times B + 16 \quad \text{Eq. 1}$$

where n R denotes a red signal, G denotes a green signal, and B denotes a blue signal.

After extracting the Y-signal component from the input image, the noise of the input image is removed at step S212.

The second step is a Hessian matrix calculation step S220. The Hessian Matrix calculation step S220 includes three sub-steps S221, S222, and S223. At sub-step S221, the noise is removed from a differential value obtained by differentiating the Y-signal component of the noise removed input image. Since following steps are senseless if the obtained differentiating result is unstable, the noise is removed therefrom.

After reducing the noise of the differentiating result, a second-order partial differential value is calculated at sub-step S222.

After calculating the second-order partial differential value, a Hessian matrix formed of pixels each having the second-order partial differential value is obtained at sub-step S223.

The third step is a Gaussian curvature step S230. At the Gaussian curvature step S230, strength is measured. The Gaussian curvature step S230 includes two sub-steps S231 and S232.

At sub-step S231, an eigen-value is calculated from the Hessian matrix. After calculating the eigen-value, the strength of each pixel is calculated by the Gaussian curvature at sub-step S232. The strength is calculated by smoothing the result of multiplying two eigen-values obtained from the Hessian matrix and absolute values thereof.

In the present embodiment, a Gaussian curvature calculated by Eq. 2 is used to extract the feature point.

$$\text{Gaussian curvature} = k_1 \ast k_2, k_1 \geq k_2 \quad \text{Eq. 2}$$

where $k_1$ and $k_2$ denote eigen-values of a Hessian matrix.

The eigen-value of the Hessian matrix is calculated from the maximum value $k_1$ and the minimum value $k_2$ of main axis variation. That is, the eigen-values of the Hessian matrix are main axis variation. If one axis significantly varies, $k_1$ becomes larger but $k_2$ becomes close to 0. Therefore, the multiple of the eigen-values of the Hessian matrix becomes smaller, so similar result can be obtained. Also, the multiple of the eigen-values of the Hessian matrix is identical to a Gaussian curvature. In the feature point extracting step, a Hessian matrix having second-order partial differential values are used.

The fourth step for extracting a feature point is a feature point extracting step S240. The feature point extracting step S240 includes three sub-steps S241, S242, and S243.

The first sub-step is a threshold strength applying step S241. At step S241, values smaller than a predetermined value are set to '0' by applying a threshold value based on the measured strength. Pixels passed in the threshold value are extracted as a feature point candidate.

The second sub-step is a strength sorting in a descending order step S242. At the strength sorting in a descending order step S242, a descending sort is applied to the detected feature point group based on strength. After selecting feature points having the strongest strength, feature points overlapped on the distance r are removed from the feature point candidate group.

As a third sub-step S243, upper-level N pixels are extracted by repeatedly performing the second sub-step S242. Since the storage space of a disk is limited, the limited numbers of feature points are extracted. Also, if the number of feature points increases, the complexity thereof also increases.

Figure 3:
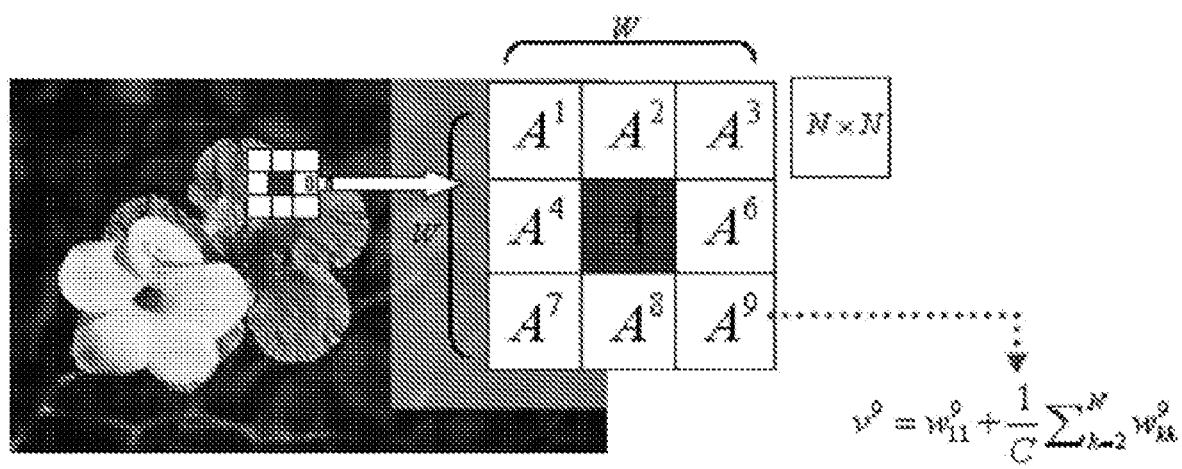
FIG. 3 is a diagram illustrating a method for calculating an identifier in a SVD based image identifying system according to an embodiment of the present invention.

FIG. 3 is a diagram illustrating a method for calculating an identifier in a SVD based image identifying system according to an embodiment of the present invention.

Since another aspect of the present invention is to develop an image identifier durable for coordinate axis variation, it is difficult to confirm the identity of feature points only using the position information of feature points. In order to determine the identity of two feature points, other information is needed to make the determination of identity easier.

In the present embodiment, a 9-byte vector is formed using a singular value of singular value decomposition (SVD). The SVD decomposes a square matrix ($A_{n \times p}$) into a shape of $U_{n \times n} \Sigma_{n \times p} V_{p \times p}^T$. The square matrix is calculated from regions adjacent to the feature point extracted by the feature point extracting module 110.

In generally, if p>n, $U^T U = I_{n \times n}$, $V^T V = I_{p \times p}$, and $\Sigma$ are a diagonal matrix as:

$$\Sigma = \begin{pmatrix} w_{11} & \cdots & & 0 \\ & w_{22} & & \\ \vdots & & \ddots & \vdots \\ 0 & & \cdots & w_{nn} & 0 \end{pmatrix},$$

wherein, $w_{11} \geq w_{22} \geq \ldots \geq w_{nn} \geq 0$.

If n=p, the degrees of U, $\Sigma$, and V are same. In the proposed method, the degrees are set to be the same. When a feature point is extracted using a Gaussian curvature, a W×W local region is obtained based on the extracted feature point.

The obtained local region is divided into M N×N sub regions. Singular values are obtained by decomposing each of sub regions into singular value decomposition (SVD). If the size if 3×3, each of the sub regions has three of singular values. The obtained singular values of each sub region are contracted from N to 1 by Eq. 3. Finally, a vector, which is local identifier of a feature point=$[v^1, v^2, \ldots, v^M]$, is obtained. A set of local identifiers is defined as an image identifier.

$$v^i = w_{11}^i + \frac{1}{C} \sum_{k=2}^{N} w_{kk}^i, i = 1, 2, \ldots, M. \quad \text{Eq. 3}$$

In Eq. 3, a suffix i denotes the $i^{th}$ sub region, $v^i$ is a reduced value, and $w_{kk}^i$ is an inner value of a diagonal matrix $\Sigma$ of $i^{th}$ sub region. C is a user constant to apply a weight to a comparatively less important value.

Experimentally, C, W, M, and N are defined as 10, 15, 9, and 5, respectively. FIG. 3 illustrates a process for obtaining a value of $V^9$ for a sub region $A^9$ and M=9. In FIG. 3, the center position of $A^5$ is the location of a feature point.

Hereinafter, a matching step will be described. At the matching step, feature points and local identifiers are extracted from two images, and the similarity of the extracted feature points and local identifiers is determined. After obtaining the feature point and the local identifier, it determines whether the extracted feature point is identical to a feature point of other image using the extracted local identifier.

Since an aspect of the present invention is to determine the identity of two images, it is not necessary to estimate other transform parameters. The identity of two images can be determined by the number of matched feature points. However, it is not sufficient to determine the identity of two images using only the number of the matched feature points. It is because that the same patterns are repeatedly generated in an image and a local identifier is set according to image distortion.

It is a high-cost process to find a pair of most similar feature points, pure one to one relation, from pairs of one feature point and a plurality of similar feature points, one to multiple relations. Although a pair of matched feature points is not accurately found, the SVD based image identifying system according to an embodiment of the present invention can provide a high performed of identifying a target image.

In case of identifying a predetermined image from a plurality of images having similar patterns, it is very difficult to determine which feature points of images are more similar to a feature point of the predetermined image without consideration of the geometrical information of feature points. Therefore, a predetermined penalty is given to feature points having one to multiple relations. Table 1 shows a method of fining how many relations to other feature point a feature point has.

TABLE 1

Algorithm for giving a penalty to feature point pairs according to distance

```
FUNCTION distance_fp(fpo, fpt, ldd_threshold)
fptnum[1..N] = 0
for j=1...ldoNum,
    count = 0;
    min_dist = 1000;
    min_idx = -1;
    for k=1...ldtnum,
        cmpdist = localdescriptor_distance( fpo[j], fpt[j] );
        if cmpdist < distance_threshold,
            if cmpdist < min_dist,
                min_dist = cmpdist;
                min_idx = k;
            end
        end
    end
```

TABLE 1-continued

Algorithm for giving a penalty to feature point pairs according to distance

```
        if min_idx > -1,
            fptnum[min_idx] = fptnum[min_idx] + 1;
        end
    end
    distance = 0;
    for i=1...N,
        if fptnum[i] > 0,
            distance = distance + T /fptnum[i];
        end
    end
    return distance
```

In Table 1, 'fpo' and 'fpt' denote the identifiers of two images, 'ldoNum' denotes the number of fpo's feature points, and ldtNum is the number of fpt's feature points. 'localdescriptor_distance( )' is an Euclidean distance of two local descriptors.

In the present embodiment, an Euclidean distance $$\left( dist(A, B) = \sqrt{\sum_{i=1}^{n} (a_i - b_i)^2}, A = \{a_1, a_2, \ldots, a_n\}, \text{ and } B = \{b_1, b_2, \ldots, b_n\} \right)$$

is measured. 'ldd_threshold' denotes a boundary value of a Euclidean distance between two local identifiers. As shown in Table 1, the function distance_fp finally returns the Euclidean distance of identifiers of two images. The larger the return distance value is, the more the two images are similar. Although T is a user defined constant, it must be larger than the maximum number of feature points. If thirty feature points are extracted from each of images, T must be minimally set to 30 in order to make "T/fptnum[i]" an improper fraction. In a simulation, ldd_threshold is set to 200.

It will be apparent to those skilled in the art that various modifications and variations can be made in the present invention. Thus, it is intended that the present invention covers the modifications and variations of this invention provided they come within the scope of the appended claims and their equivalents.

As described above, the system and method for identifying an image based on singular value decomposition (SVD) can effectively search an image from numerous images distributed through Internet or stored in a storage medium.

The system and method for identifying an image based on singular value decomposition (SVD) according to an embodiment of the present invention can easily and quickly search and identify images although the original characteristics of the images are modified or transformed by duplication, malicious attack, or according to a type of Internet and reproducing device.

What is claimed is:

1. A system for identifying an image based on SVD (singular value decomposition) including a non-transitory computer readable medium, the non-transitory computer readable medium comprising:
a feature point extracting module configured to extract at least one feature point from an input image using a strength of a Gaussian curvature of each pixel from the input image;
an identifier detecting module configured to detect a local identifier based on SVD (singular value decomposition) for sub-regions adjacent to the extracted feature point; and
a matching module configured to compare the detected local identifier from the identifier detecting module with an image in a database.

2. The system of claim 1, wherein the feature point extracting module is configured to extract a feature point using a Y component of the input image.

3. The system of claim 2, wherein the feature point extracting module is configured to reduce noise of a differential value of the Y component.

4. The system of claim 3, wherein the feature point extracting module is configured to measure a strength of a Gaussian curvature using an eigen-value of a Hessian matrix to extract a feature point.

5. The system of claim 4, wherein the eigen-value of the Hessian matrix is calculated by a second order partial differential value for each pixel.

6. The system of claim 4, wherein the feature point extracting module is configured to extract a candidate feature point group by comparing the strength of a Gaussian curvature for each pixel with a pre-set threshold value.

7. The system of claim 6, wherein the feature point extracting module is configured to sort the candidate feature point group in a descending order based on the strength and to extract a feature point from a candidate group that does not overlap another point in the candidate group.

8. The system of claim 1, wherein the identifier detecting module is configured to divide a local region adjacent to the extracted feature point into a plurality of sub-regions of substantially the same size, and calculates a singular value by decomposing each of the sub regions using singular value decomposition (SVD).

9. The system of claim 8, wherein the identifier detecting module is configured to contract the values of the sub-regions to one value to detect the identifier.

10. The system of claim 9, wherein the singular values of the sub-regions are calculated by an equation:

$$v^i = w^i_{11} + \frac{1}{C} \sum_{k=2}^{N} w^i_{kk}, i = 1, 2, \ldots, M$$

where a superscript i denotes the $i^{th}$ sub region, $v^i$ is a reduced value, $w_{kk}^i$ is an inner value of a diagonal matrix $\Sigma$ of $i^{th}$ sub region, and C is a user constant for applying weight to a comparatively less important value.

11. The system of claim 1, wherein the matching module is configured to compare the detected identifier with an identifier of an image stored in the image database.

12. The system of claim 11, wherein the matching module uses a boundary value of an identity distance between identifiers to determine similarity.

13. A non-transitory computer readable medium including a computer program stored thereon for identifying an image based on SVD (singular value decomposition), wherein the computer program instructs a microprocessor to perform the steps of:
measuring strength of a Gaussian curvature of a plurality of pixels from an input image;
extracting at least one feature point by comparing the measured strength of the Gaussian curvature of each pixel with a pre-set threshold value;

dividing a local region adjacent to the extracted feature point into sub-regions of the same size;

decomposing each of the sub regions using SVD (singular value decomposition) and obtaining singular values based on the SVD; and comparing the detected identifier with at least one image in a database.

14. The method of claim 13, wherein in the step of measuring strength, noise of differential value is removed by extracting a Y component of the input image to measure strength of a Gaussian curvature of each pixel.

15. The method of claim 13, wherein in the step of measuring strength, an eigen-value of a Hessian matrix is used to measure the strength of a Gaussian curvature.

16. The method of claim 15, wherein the eigen-value of the Hessian matrix is calculated using a second order partial differential value.

17. The method of claim 13, further comprising extracting a candidate feature point group by comparing the strength of a Gaussian curvature for each pixel with a pre-set threshold value.

18. The method of claim 17, wherein in the step of extracting the feature point, the candidate feature point group is sorted in a descending order based on strength and a feature point that does not overlap another point in the candidate group is extracted.

19. The method of claim 13, wherein in the step of detecting the identifier, values of the sub-regions are contracted to detect an identifier.

20. The method of claim 19, wherein the singular values of the sub-regions is simplified by an equation:

$$v^i = w^i_{11} + \frac{1}{C}\sum_{k=2}^{N} w^i_{kk}, i = 1, 2, \ldots, M$$

where a superscript i denotes the $i^{th}$ sub region, $v^i$ is a reduced value, $w_{kk}^i$ is an inner value of a diagonal matrix $\Sigma$ of $i^{th}$ sub region, and C is a user constant for applying weight to a comparatively less important value.

21. The non-transitory computer readable recording medium of claim 13, wherein the medium is configured to operate on a computer.

22. A non-transitory computer-readable storage medium with an executable program for identifying an image based on SVD (singular value decomposition) stored thereon, wherein the program instructs a computer to perform the following steps:

extracting at least one feature point from an input image using a strength of a Gaussian curvature of each pixel from the input image;

detecting a local identifier based on SVD (singular value decomposition) for sub-regions adjacent to the extracted feature points; and comparing the detected local identifier from the identifier detecting module with an image in a database stored on a non-transitory computer-readable storage medium.

* * * * *